Patented Aug. 15, 1939

2,169,386

UNITED STATES PATENT OFFICE 2,169,386

MANUFACTURE OF FOUNDRY MOLDS

John Howe Hall, Philadelphia, Pa., assignor to Birdsboro Steel Foundry & Machine Company, Birdsboro, Pa., a corporation of Pennsylvania No Drawing. Application November 5, 1938
Serial No. 239,181

2 Claims. (Cl. 22—189)

The present invention relates to the manufacture of foundry molds and more especially to an improvement in the process described in the Durand Patents Nos. 1,918,089, 1,918,090 and 1,924,028. As described in the Durand patents, foundry molds are made of a mixture of sand and cement with considerably less water than is employed in usual cement-sand mixtures. This mixture is spoken of in the Durand patents as a "sub-hydrated" mixture. The moisture is so limited that when the cement-sand mixture is taken in the hand it is just coherent enough to form a highly friable ball. This mixture can be molded or tamped to form a mold or core of relatively high porosity and good structural strength. The Durand process has gone into extensive use and has made a distinct improvement in foundry practice. Difficulty, however, has been encountered in some instances, particularly in making castings of manganese steel and other metals poured at very high temperatures, where the casting has re-entrant angles backed up by a considerable body of metal, requiring a projecting part on the mold. The high heat of the metal and its access to both sides of the projecting part of the mold often results in the penetration of the sand by the metal, forming at the bottom of the re-entrant angle of the casting a porous mass consisting of a conglomerate of metal and partially fused sand which is exceedingly resistant to removal by cutting, grinding or chipping. This action of burning in of the mold and the formation of such conglomerate is apparently due to a combination of physical and chemical factors. The cement-sand mold mix must be porous to allow the escape of gases through the mold body. The cement, which is usually Portland cement and therefore contains a high proportion of calcium oxide, tends under the high heat of the metal to flux the silicious sand and form a sort of glass, which does not resist the penetration of the metal and tends to form the intensely hard agglomerate of metal and fluxed and partially fused mold material.

I have found that such disadvantages may be overcome by providing a mold of the Durand type with a thin facing of substantial thickness composed of titanium dioxide bonded with cement. The titanium dioxide may be natural or artificial. The natural ore of titanium dioxide, rutile, is satisfactory. Another naturally occurring ore is octahedrite. The titanium dioxide should be granular, preferably of a particle size of a fine molding sand or even finer. The finely divided titanium dioxide gives a smooth mold surface and still provides the requisite porosity for the escape of gases. In making such mixture I preferably use approximately 100 parts by weight of titanium dioxide, 13 parts by weight of Portland cement and just enough water to make a moldable mix. For finely divided titanium dioxide the amount of water usually required is about 9 per cent by weight of the combined titanium dioxide and cement. While the water content may be somewhat more than that of the typical Durand mix, it is preferable to use an amount of water substantially less than that employed in making usual cement mixes, so that a mixture is formed which is moldable but which is not wet enough to slump and which will have a substantial porosity although somewhat lower than that usually required by the Durand mix which makes up the body of the mold.

In making a mold according to the present invention, a moldable mix of the finely divided granular titanium dioxide and cement is tamped against the pattern to form a facing layer usually about ½ to ¾" thick, although under some circumstances it may be thicker, say up to two inches or even more. This facing layer may be employed over the entire face of the mold cavity or it may be employed only at the points where trouble would be otherwise encountered of the molten metal penetrating into the mold material. The term "facing" as used in the claims is intended to include a facing which may cover a part or the whole of the mold cavity. The surface of the facing which is away from the pattern is preferably left rough or roughened to provide a strong bond with the cement-sand mixture which is next appl'ed. The mold box or frame is then tamped full of the "sub-hydrated" mixture of sand and cement described in the Durand patents. The mold is preferably strengthened by iron rods embedded in the cement-sand mold material. The mold box is taken off the mold, which is allowed to set as in the regular Durand process, and which is then ready for use.

The completed mold consists of a porous backing formed with a relatively dry or "sub-hydrated" mixture of sand and cement and a facing which has a high resistance to penetration of the molten metal, and which may be of a lower porosity than the backing and which is formed integral with the backing. The cement binder of the facing and backing unites the two parts together and there is little, if any, tendency for the facing to separate from the backing. The facing layer containing the titanium dioxide prevents the penetration of the steel or other highly heated metal into the mold material and the backing, which is made of the regular Durand mix, has the required porosity for the escape of the gases from the mold and also has the structural strength required.

The Portland cements usually employed in making the Durand molds are basic, containing usually about 60% or over of calcium oxide, together with smaller amounts of the oxides of silicon, aluminum, iron and magnesium. The highly basic cement tends to flux the acid silica sand under the high heat of the molten metal in the usual Durand mold mix. This condition is further aggravated by the basic character of the iron and manganese oxides which are formed upon the surface of the molten metal. The titanium dioxide is not acid like silica, and therefore when the titanium dioxide is substituted for silica sand at the surfaces of the mold which are subjected to the high heat of the molten steel, the fluxing tendencies of the basic cement and basic oxides of iron and manganese with the acid silica sand of the usual Durand mix is obviated. The titanium dioxide is very refractory, being infusible for a blow pipe.

The requirements of the refractory facing material when bonded with the basic cement and subjected to the basic oxidation products of the metal in resisting fusion and burning in at high temperatures are partly physical and partly chemical. The physical properties required include high melting point and the ability to impart a smooth facing to the casting while allowing the escape of the gases. The chemical properties include the resistance to fluxing with the cement and the oxidation products of the molten metal. However, many tests have shown that it cannot be predicted upon either their refractoriness or their basicity which materials when used in a cement bonded facing for a Durand type mold will withstand such burning in by highly heated steel. For example, magnesia, which has a very high melting point and which is basic, has proved to be virtually worthless for such purpose. The same is true of most refractory materials. The present invention is based upon the empirical discovery upon the basis of many tests and its performance in casting steel that titanium dioxide satisfies the rigid requirements and provides a facing for use in the Durand type molds which resists the burning in encountered when the molds are faced with ordinary sands.

While it is preferred that the facing layer be bonded with and supported by a cement bonded porous backing material like that specifically described in the Durand patents, other backing materials may be used, particularly in the making of cores where low resistance to collapsing is desired. In such cases, the ordinary cement-sand mixture may be replaced in part or in whole by green or dry sand, cinders, or the like. The facing layer, which consists principally of the titanium dioxide, may, if desired, contain minor amounts of other sands, but not sufficient however materially to affect the properties of the mixture in resisting the penetration or burning in of steel under high temperatures. The material used for the binder is preferably high early strength Portland cement, although ordinary Portland cement or alumina cements may be used. The term "foundry molds" is intended to include cores as well as molds.

While I have described the preferred embodiment of my invention, it is to be understood that the invention may be otherwise embodied and practiced within the scope of the following claims.

I claim:

1. A foundry mold comprising a porous facing of substantial thickness composed principally of fine granular titanium dioxide bonded with cement, and a backing integrally united with the facing and composed principally of ordinary sand bonded with cement and having a high porosity.

2. A foundry mold having a facing consisting principally of fine granular titanium dioxide bonded with cement.

JOHN HOWE HALL.